US012730210B2

(12) United States Patent
Kossaczky et al.

(10) Patent No.: US 12,730,210 B2
(45) Date of Patent: Sep. 8, 2026

(54) DETERMINING EGO MOTION

(71) Applicant: Aptiv Technologies AG, Schaffhausen (CH)

(72) Inventors: Igor Kossaczky, Wuppertal (DE); Mirko Meuter, Erkrath (DE)

(73) Assignee: Aptiv Technologies AG, Schaffhausen (CH)

( * ) Notice: Subject to any disclaimer, the term of this patent is extended or adjusted under 35 U.S.C. 154(b) by 328 days.

(21) Appl. No.: 18/353,661

(22) Filed: Jul. 17, 2023

(65) Prior Publication Data

US 2024/0019566 A1 Jan. 18, 2024

(30) Foreign Application Priority Data

Jul. 18, 2022 (EP) .................................... 22185469

(51) Int. Cl.
*G01S 13/60* (2006.01)
*G01S 7/41* (2006.01)
*G01S 13/89* (2006.01)
*G01S 13/931* (2020.01)

(52) U.S. Cl.
CPC .............. *G01S 13/60* (2013.01); *G01S 7/417* (2013.01); *G01S 13/89* (2013.01); *G01S 13/931* (2013.01)

(58) Field of Classification Search
None
See application file for complete search history.

(56) References Cited

U.S. PATENT DOCUMENTS 11,153,503 B1 * 10/2021 Ebrahimi Afrouzi .. H04N 7/183
2019/0195998 A1 * 6/2019 Campbell ............. G01S 13/426
2021/0255304 A1 * 8/2021 Fontijne ................. G06V 20/10

FOREIGN PATENT DOCUMENTS

EP 3943970 1/2022
FR 3094798 10/2020
WO 2022036332 2/2022

OTHER PUBLICATIONS

"Extended European Search Report", EP Application No. 22185469.8, Jan. 2, 2023, 10 pages.
Barjenbruch, et al., "Joint Spatial and Doppler-based Ego-Motion Estimation for Automotive Radars", Jun. 2015, 6 pages.

(Continued)

*Primary Examiner* — Resha Desai
*Assistant Examiner* — Brandon James Henson
(74) *Attorney, Agent, or Firm* — Harness, Dickey & Pierce, P.L.C.

(57) ABSTRACT

A computer implemented method to determine ego motion of a vehicle, the vehicle having at least one radar emitter with a plurality of reception antennae, the method including the operations of acquiring, from the reception antennae, different frames of radar data of the vehicle surrounding environment, each frame being acquired at a different time; deriving from the radar data of each different frame, an environment map of the vehicle surrounding environment; and deriving the ego motion of the vehicle by: merging environment maps from at least two different frames into one accumulated map, computing, from the accumulated map, a motion vector for each pixel of the accumulated map, and extracting, from the accumulated map, a mask map including a tensor mapping a weight for each pixel of the accumulated map.

20 Claims, 10 Drawing Sheets

(56) References Cited

OTHER PUBLICATIONS

Barnes, et al., "Under the Radar: Learning to Predict Robust Keypoints for Odometry Estimation and Metric Localisation in Radar", Feb. 24, 2020, 7 pages.
Sorkine-Hornung, et al., "Least-Squares Rigid Motion Using SVD", Jan. 16, 2017, 5 pages.

* cited by examiner

DETERMINING EGO MOTION

INCORPORATION BY REFERENCE

This application claims priority to European Patent Application No. EP22185469.8, filed Jul. 18, 2022, the disclosure of which is incorporated by reference in its entirety.

BACKGROUND

Mobility is currently a major source of pollution and waste of time in most countries in the world, especially in major city areas. In addition, mobility needs of remote areas are not always met. Autonomous vehicles are currently developed in an attempt to reduce pollution and wasted time and to propose mobility or delivery services to remote areas.

SUMMARY

A first aspect of the present disclosure relates to a computer implemented method to determine ego motion of a vehicle, the vehicle having at least one radar emitter with a plurality of reception antennae, the method including the steps of:

- acquiring, from the reception antennae, different frames of radar data of the vehicle surrounding environment, each frame being acquired at a different time;
- deriving from the radar data of each different frame, an environment map of the vehicle surrounding environment; and
- deriving the ego motion of the vehicle by:
  - merging environment maps from at least two different frames into one accumulated map,
  - computing, from the accumulated map, a motion vector for each pixel of the accumulated map,
  - extracting, from the accumulated map, a mask map including a tensor mapping a weight for each pixel of the accumulated map.

The above method allows to determine ego motion of a based on radar data with a high level of accuracy. This may thus increase the level of safety and/or autonomy of such a vehicle. For example, the frames of radar data are consecutive in time.

Advantageously, the step of deriving the ego motion includes associating each motion vector by a weight of the mask map. This step allows to weight or filter the motion vectors, for example to give more importance or significance to the motion vectors which are the most relevant to ego motion determination.

Advantageously, the step of deriving the ego motion includes computing a translation and a rotation of the vehicle surrounding environment introduced by a movement of the vehicle, based on the computed motion vectors and the extracted mask map. Such a computing step may be performed by one or more deterministic mathematical formula.

Advantageously, the step of deriving the ego motion includes deriving a x-speed, a y-speed and a yaw speed of the vehicle.

Advantageously, the computer implemented method includes a step of extracting reference points from the mask map, the reference points being associated with objects of the surrounding environment of the vehicle. For example, the reference points may be selected from pixels having a high weight in the mask map, pixels showing a specific motif and/or recurrent pixel throughout several environment maps. These reference points may be used to precisely locate the vehicle into the surrounding environment.

Advantageously, the computer implement method includes a step of graphically representing the mask map and/or the environment map to a display of the vehicle. This graphical representation may be relevant for a vehicle driver, for a vehicle passenger or for a technician working on the vehicle. For example, the mask map may be seen as a filtered or cleaned version of the accumulated map, in which only the still objects of the vehicle surrounding environment may appear.

Advantageously, the computer implement method includes a step of graphically representing one or more characteristics extracted from the mask map and/or the environment map. The characteristics may include features from the radar data, objects surrounding the vehicle, ego motion characteristics, etc.

Advantageously, the step of computing a motion vector for each pixel of the accumulated map and the step of extracting the mask map is performed by one or more layers of a trained neural network. For example, one or more neural network layers compute the motion vectors and another or others layers extract the mask map.

The activation function of these layers may be different. For example, the activation function of the one or more layers may be chosen among a linear activation or a hyperbolic tangent multiplied by a maximum speed constant. The activation function of the another or others layers may be chosen among a sigmoid function, a rectified linear unit ReLU and Softplus.

Advantageously, the radar data includes a plurality of Doppler channels and the step of deriving an environment map of the vehicle surrounding environment includes a step of reducing the plurality of Doppler channels to one feature channel. This step may thus remove speed information from the radar data, thus allowing to derive ego motion from range and angle data only. This may provide an additional layer of redundancy and safety.

For example, range, Doppler, angle data cubes derived from the radar data may be transformed into range, feature, angle data cubes by reducing the number of Doppler channels. For example, the Doppler channels are concatenated or summed into one or few feature channels, preferably one feature channel or alternatively 2 to 5 feature channels.

Advantageously, the computer implemented method includes a step of controlling one or more functions of an advanced driver-assistance system ADAS of a vehicle These functions may be maintaining the vehicle in a lane, preventing sliding of a vehicle, changing direction of a vehicle, etc.

Preferably, the step of deriving an environment map comprises a step of angle finding transforming range, Doppler, antenna data cubes from the radar data in range, doppler, angle data cubes, thus obtaining polar environment maps.

Preferably, the step of deriving an environment map comprises the step of transforming the range, doppler, angle data cube or the range, feature, angle data cubes into Cartesian coordinates data cubes, thus obtaining an environment map. The Cartesian coordinate may be vehicle coordinate system (VCS). For example, the environment map is a bird-eye view of at least part of the surrounding environment of the vehicle.

A second aspect of the present disclosure is a method for training a neural network for determining ego motion of a vehicle, the method comprising the steps of:

providing different frames of radar data of a training vehicle surrounding environment and corresponding localization or driving information of the training vehicle, deriving ego motion from the radar data by the method of the first aspect, deriving ground truth ego motion based on the localization or driving information.

determining optimal weights of a neural network by minimizing a loss function between the ego motion as an input and the ground truth ego motion as a target output, the neural network including layers performing steps of the method of the first aspect.

This backward propagation training allows a quick and efficient training with limited training data. It can be performed online or preferably offline.

Preferably, all the steps of the method are performed by the neural network and all the neural network layers are trained together by backward propagation. If a step of angle finding is performed, this step may be performed by a different neural network or by another method.

A third aspect of the disclosure concerns a data processing device comprising means for carrying out the method according to the first aspect. For example, the data processing apparatus may include one or more processing units, one or more memory units and one or more I/O units.

A fourth aspect of the present disclosure relates to a computer program comprising instructions which, when the program is executed by a computer, cause the computer to carry out the method of the first aspect or the second aspect of the disclosure.

A fifth aspect of the disclosure relates to a computer-readable medium comprising instructions which, when executed by a computer, cause the computer to carry out the method of the first aspect or the second aspect of the disclosure.

Preferably, the program instructions are stored in a storage module related to the vehicle, such as volatile memory, e.g., ROM, RAM, etc., and/or non-volatile memory, e.g., Flash, NAND, etc., that is permanently or removably integrated in the vehicle or connectable to the vehicle, e.g., via the 'cloud', and can be executed by a computer, or a calculator, of the vehicle, such as one or more modules of electronic control units (ECUs).

A sixth aspect of the disclosure relates to a vehicle including the data processing device of the fourth aspect of the disclosure and/or the computer-readable medium of the sixth aspect of the disclosure.

A seventh aspect of the disclosure relates to a computer implemented method to determine ego motion of a vehicle, the method including the steps of:

Acquiring or computing environment maps of the surroundings of the vehicle, the environment maps corresponding to different periods of time and being preferably consecutive Accumulating or merging at least two environment maps in an accumulated environment map Computing motion vectors for each pixel of the accumulated environment map Extracting a mask map including a weight for each pixel of the accumulated environment map Deriving ego motion from the above motion vectors and mask map.

An eighth aspect of the disclosure relates to a computer implemented method to determine ego motion of a moving device, the moving device having at least one radar emitter with several reception antennae, the method including the steps of:

a) acquiring, from the reception antennae, several frames of radar data of the moving device environment, each frame being acquired at a different time b) deriving from each frame an environment map of the surrounding environment of the moving device c) merging at least two environment maps from at least two frames into one accumulated map d) computing, from the accumulated map, a motion vector for every pixel of the accumulated map by a first neural network layer e) extracting, from the accumulated map, a mask map including a tensor mapping a weight for every pixel of the accumulated map, by a second neural network layer f) deriving the ego motion of the moving device based on the motion vectors and the mask map.

The seventh and eighth aspects of the present disclosure may have all the preferable features and steps of the first aspect of the disclosure.

BRIEF DESCRIPTION OF THE DRAWINGS

Other features, purposes and advantages of the disclosure will become more explicit by means of reading the detailed statement of the non-restrictive embodiments made with reference to the accompanying drawings.

DETAILED DESCRIPTION

The present disclosure relates to the field of ego motion methods and systems. Such methods and systems can be used for example in a vehicle or a moving device to determine speed and/or direction of the vehicle or the moving device.

The present disclosure applies to all kind of vehicles including cars, trucks, buses, motorbikes and drones, preferably with autonomous or semi-autonomous driving capabilities. In the course of developing autonomous or semi-autonomous vehicles, determining with a high level of reliability the movements, displacements or motions of the vehicle such as translation and rotation is instrumental to ensure safe driving and an appropriate guidance toward a target destination.

The motions of a vehicle can be determined from the vehicle based on various sources, such as vehicle rolling sensors detecting a speed and/or a direction of the front wheels, be determined based on GPS data and/or based on camera images. Nevertheless, the data obtained from these sources may be corrupted, inaccurate or unavailable for various reasons and it is desirable to provide an additional source to determine ego motion of a vehicle in order to add a layer of redundancy and security.

Vehicles may include several sensors such as one or several radars, one or several cameras, one or several ultrasonic sensors and a GPS sensor in order to determine localization and/or driving information of the vehicle, and to obtain information of the surrounding environment of the vehicle. For example, radar data may be used to determine ego motion of the vehicle.

The vehicle may be a land vehicle such as a car or a truck with autonomous or semi-autonomous driving capacity. The vehicle may include one or several radar emitters and several reception antennae.

Figure 1A:
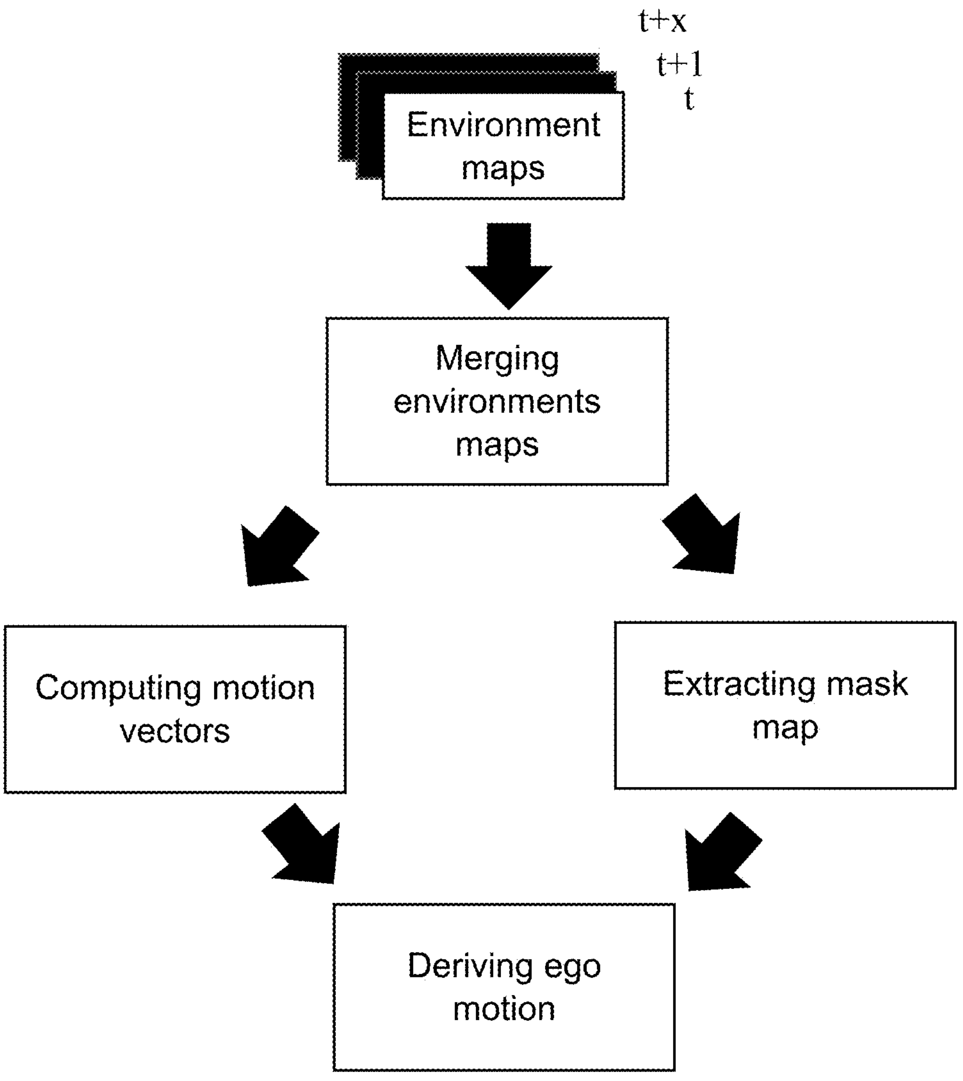
FIG. 1A shows a flow chart of a general method according to the present disclosure.

FIG. 1A shows a flow chart of a method to determine ego motion of a moving vehicle. This method may be performed by a computer for example an on-board computer and/or optionally a remote computer communicating with the vehicle.

Environment maps showing a surrounding environment of the vehicle may be acquired, derived or computed at different times. The environment map may map the objects or obstacles in the vehicle surrounding environment, for example from a bird-eye view or top view. For example, the environment map is derived from radar data and the features of the environment map correspond at least partially to objects or obstacles reflecting radar waves in the vehicle surrounding environment.

Preferably the environment maps are acquired, derived or computed on board the vehicle. An environment map may correspond to a specific time and may include features in polar coordinates or preferably in Cartesian coordinates such as vehicle coordinate system (VCS). Here, a feature is a radar feature and may be related to an actual object of the vehicle environment and/or may be related to a radar artefact.

Then, at least two environment maps, preferably consecutive in time, are accumulated into an accumulated map. This accumulated map may show features of different frames and may thus include several occurrences of a same feature, at different positions due to the movement of the vehicle and/or the movement of the objects in the environment of the vehicle.

A motion vector may be computed for each pixel of the accumulated map. For example, the motion vector may be computed based on each pixel characteristics and/or surrounding such as the neighbor pixels, for example pixels having close or similar characteristics. Consequently, a motion vector field or map may be obtained from the accumulated environment maps. Such a computing step may be performed by one or more neural network layers, for example using one or several convolution steps.

A mask map is extracted from the accumulated map. This mask map may include a weight of each pixel of the accumulated map, a weight representing somehow the "significance" of the pixel for determining ego motion. Such a computing step may be performed by one or more neural network layers.

Ego motion is derived from the mask map and the motion vectors. For example, each motion vector may be weighted by the corresponding weight of the mask map and ego motion may be determined based on the weighted motion vectors. A deterministic formula may be used, for example including the weight and computing a rotation and a translation of the surrounding environment of the vehicle, the rotation and translation of the surrounding environment being caused by the vehicle motion.

The above method step will be more detailed in the particular example of FIG. 1B described below.

Figure 1B:
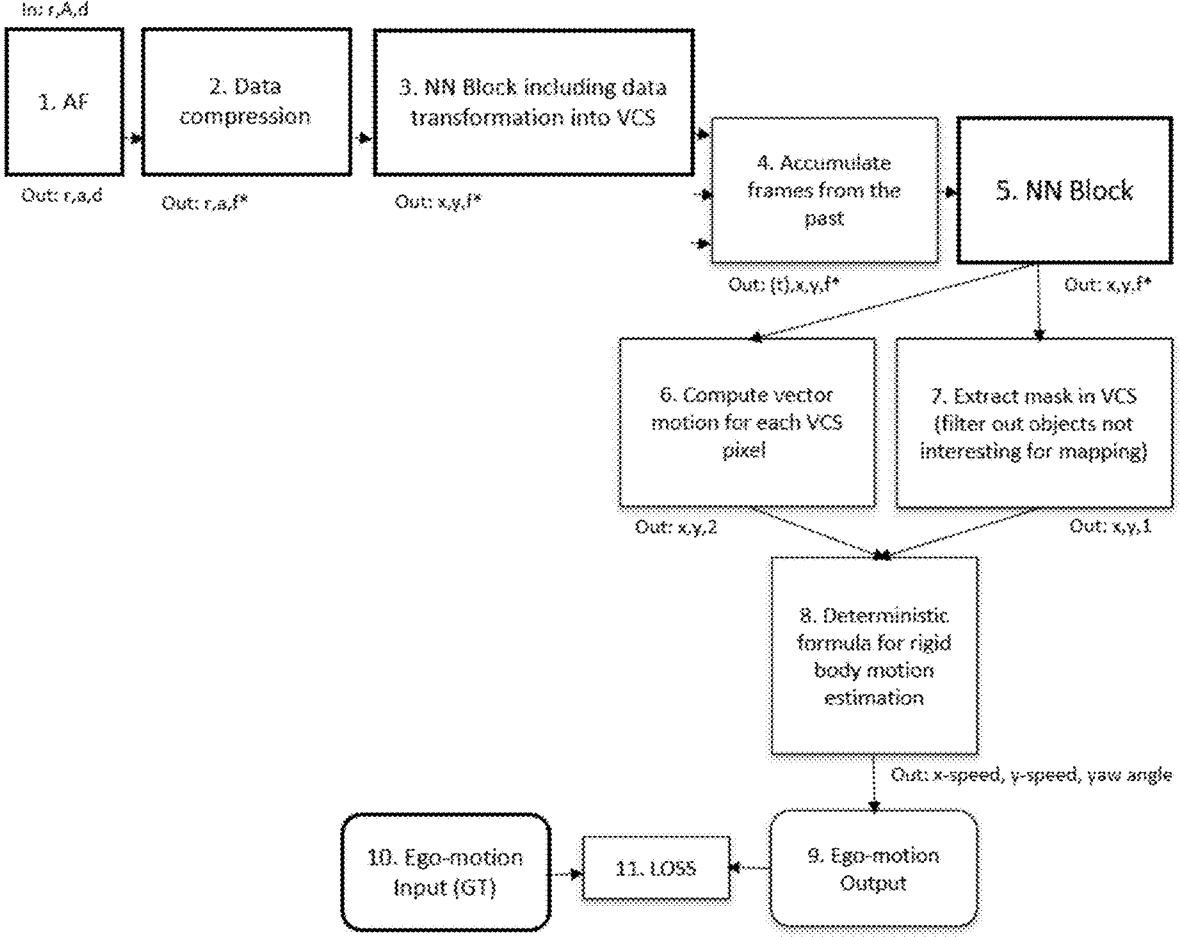
FIG. 1B shows a flow chart of a detailed method according to the present disclosure.

FIG. 1B provides an exemplary implementation of a method to determine ego motion of a vehicle. This method may be performed by a computer for example an on-board computer and/or optionally a remote computer communicating with the vehicle. Steps 1) to 3) correspond to a possible method of obtaining environment maps of the surrounding environment of the vehicle from radar data.

More particularly, different frames of radar data of the vehicle surrounding environment may be acquired from the reception antennae of the vehicle, each frame being acquired at a different time, for example every second, or every 100 ms or shorter.

In step 1), angle finding is performed, for example according to a method described below. Consequently, the input of step 1) may be range, Antenna, doppler (r, A, d) data cubes and the output may be range, angle, doppler (r, a, d) data cubes, each data cube corresponding to a radar frame.

In step 2), an optional data compression is performed on the Doppler channels. The input of step 2) may be (r, a, d) data cubes from step 1) and the output may be range, angle, feature (r, a f*) data cubes. These (r, a, d) or (r, a f*) data cubes may correspond to polar environment maps, representing at least part of a surrounding environment of the vehicle using polar coordinates, e.g., range and angle.

Step 3) corresponds to obtaining an environment map into vehicle coordinate system (VCS). The input of step 3) may be the output of step 1) or the output of step 2). The output of step 3) may be under the form of x, y, features (x, y, f*) data cubes. Optionally, an additional dimension of the output file may be a time dimension, for example the time or time period at which each environment map has been captured or generated or a number attributed sequentially to each environment map.

In step 4), the VCS environment maps of step 3) may be accumulated or merged, as described above. For example, two, three, five or more environment maps are accumulated and the environment maps are preferably consecutive in time. Consequently, an accumulated map covering a certain time period may be obtained. The output of step 4) may be similar to the output of step 3), for example with a possible time dimension (t) where the accumulated environment maps are stacked or corresponding to the time period covered by the accumulated map.

In step 5), an optional pretreatment may be performed in order to pre-process the data cubes or environment maps from step 4) before steps 6) and 7). This optional pretreatment may use a neural network layer, for example including convolutional layers, pooling layers and/or self-attention layers. The output of this optional pretreatment step may be in a form similar to the output of step 4).

In step 6), a neural network layer may process the accumulated map in order to compute motion vectors, as described above. Preferably, this computing is made for each pixel of the accumulated map, for example through one or several convolutions and using an activation function. A single convolutional layer may be used, for example to optimize processing speed. Alternatively or in combination, one or several pooling layers or self-attention layers may be used.

An activation function is preferably used, preferably a linear activation or a hyperbolic tangent multiplied by a maximum speed constant. The maximum speed constant may be for example the maximum speed of a vehicle or a general speed limit, for example plus a 5 or 10% margin. The output of step 6) may be (x, y, 2) data cubes, wherein each pixel of the accumulated map is provided with two x and y values defining a motion vector.

In step 7), a mask map is extracted from the accumulated map by another or others neural network layers, as described above. For example, one or more of a convolutional layer, a pooling layer and a self-attention layer may be used with an activation function. The activation function may be sigmoid, rectified linear unit ReLU or Softplus. The mask map may include a tensor mapping a weight for each pixel of the accumulated map. The output of step 7) may be (x, y, 1) data cubes, wherein each pixel of the accumulated map is provided with a single value or weight relating to the "significance" of the pixel for ego motion determination.

In step 8), ego motion may be derived using the motion vectors of step 6) and the mask map of step 7). In particular, the weights of the mask map may be associated with the motion vectors, in order to weight or filter the motion vectors. Consequently, the mask map may have the effect to suppress or underweight pixels which are not linked with a stationary object of the vehicle surrounding environment relevant to determine ego motion, by attributing them a very low or null weight. In contrast, pixels linked with stationary objects of the environment may have an important weight and the motion vectors linked with these pixels may thus directly contribute to determining ego motion.

Ego motion may be calculated by determining the rotation and translation of each weighted pixel of the vehicle surrounding environment and deriving a global movement of the vehicle. The translation and the rotation of the vehicle surrounding environment may be caused by the motion of the vehicle from the first environment map to the last environment map of the accumulated map, in chronological order.

For example, the output of step 8) is a speed of the vehicle on two axes such as x and y and a yaw speed. For example, x is a longitudinal axis of the vehicle and y is a transversal axis of the vehicle. In step 9), the ego motion of the vehicle according to step 8) may be output to a vehicle system on-board system, for example to an advanced driver-assistance system (ADAS) or for comparison purposes with corresponding data from other sensors. Alternatively or in combination, the x-speed, y-speed and/or yaw speed from step 8) may be graphically represented in step 9) on a vehicle display.

The output of step 8) and/or 9) corresponds the time period covered by the accumulated map, e.g., the period of time corresponding to the accumulated environment maps. The method according to the present disclosure may be performed with other radar data corresponding to the subsequent time period.

In particular, ego motion may be derived in step 8) using a known mathematical method, for example disclosed in the article entitled "Least-Squares Rigid Motion using SVD", by Olga Sorkine-Hornung and Michael Rabinovich and published on Jan. 16, 2017.

According to this method, the optimal rotation and translation of the vehicle should minimize Equation 1 below, wherein p is a pixel position and q is a position of pixels summed with the computed motion vectors of step 6). In other words, p is a n×2 matrix of pixel positions and q is the same matrix summed with a n×2 matrix having corresponding motion vector in each row. Here, n denotes the number of pixels. Then, $P=\{p_1, p_2, \ldots, p_n\}$ and $Q=\{q_1, q_2, \ldots, q_n\}$ are two sets of corresponding points in $R^2$. R is the rotation matrix and t is the translation vector.

$$\sum_{i=1}^{n} w_i \|(Rp_i + t) - q_i\|^2. \quad \text{[Equation 1]}$$

Then, the weighted centroids of both point sets are computed by Equations 2 below, wherein w is n-dimensional vector of weights corresponding to each of the n pixels. The weights are acquired from the mask map of step 7).

$$\overline{p} = \frac{\sum_{i=1}^{n} w_i p_i}{\sum_{i=1}^{n} w_i}, \quad \overline{q} = \frac{\sum_{i=1}^{n} w_i q_i}{\sum_{i=1}^{n} w_i}. \quad \text{[Equations 2]}$$

The centered vectors are then computed by Equations 3 below.

$$x_i := p_i - \overline{p}, \quad y_i := q_i - \overline{q}, \quad i = 1, 2, \ldots, n. \quad \text{[Equations 3]}$$

The 2×2 covariance matrix is computed by Equation 4 below, wherein X and Y are the 2×n matrices that have $x_i$ and $y_i$ as their columns, respectively, and W=diag(w1, w2, . . . , wn).

$$S = XWY^T \quad \text{[Equation 4]}$$

Then, the singular value decomposition $S=U\Sigma V^T$ may be computed. The rotation is according to Equation 5 below.

$$R = V \begin{pmatrix} 1 & & & & \\ & 1 & & & \\ & & \ddots & & \\ & & & 1 & \\ & & & & \det(VU^T) \end{pmatrix} U^T \quad \text{[Equation 5]}$$

Finally, the optimal translation is computed according to Equation 6 below.

$$t = \overline{q} - R\overline{p} \quad \text{[Equation 6]}$$

The output of step 8) may thus be an x-speed, y-speed and yaw speed defining ego motion of the vehicle.

An environment map may be under the form of a digital image or under the form of a digital file such as a binary file in which the term "pixel" may simply refer to a piece of information of an environment map.

A graphical representation of an environment map may be optionally used or generated according to the method of the disclosure. For example, this graphical representation may be a 2D or 3D representation of the surrounding environment of the vehicle and may be used by the vehicle driver, for example to help driving in confined environments or when visibility is limited.

Alternatively or in combination, graphical characteristics extracted from the environment map, the accumulated environment map and/or the mask map may be derived, computed and/or graphically represented on a display, such as a display of the vehicle. These characteristics may correspond to features of the radar data, objects of the surrounding environment of the vehicle, x or y speed, acceleration, etc.

If required, the mask map may be represented as a color or grey scale image. For example, each pixel as a grayscale or color value according to its weight. This represented mask map may be used to graphically represent an environment map of the vehicle showing only filtered features of the surroundings of the vehicle, e.g., features that are the most relevant to ego motion determination and/or driving of the vehicle.

Optionally, reference points of the surrounding environment of the vehicle may be extracted from the mask map. These reference points may correspond for example to every pixel having a weight above a threshold value, to pixels showing a specific motif and/or to pixels recurrent among several environment maps. The reference points may correspond at least partially to still objects of the surrounding environment of the vehicles and may be used to determine a localization of the vehicle with regard to these still objects. In particular, these reference points may be used with data coming from other sensors of the vehicle to increase the localization precision and/or used as redundancy data in case of failure of other sensors.

The present method may rely on several layers of a neural network. These neural network layers are preferably trained by backward propagation, as disclosed below. Ground truth (GT) ego motion may be acquired in a step for example from a training vehicle including the one or several radars and other sensors, such as a speed sensor, wheel direction sensor, GPS sensor, Inertial Measurement Unit (IMU), etc. A set of training data may thus be acquired including ego motion, e.g., a x-speed, a y-speed and a yaw speed of the vehicle and corresponding radar data used by the present method.

The present method may thus be run with the radar data with untrained neural networks, thus providing an inaccurate ego motion as an input, the ground truth ego motion being used as a target output. The gradient of the loss function with respect to the weights of the neural network layers may then be computed. Minimizing the loss allows to find optimal weights of the neural network layers, thus training the neural network implementing the method to determine ego motion. This training method is preferably performed offline but may also be performed online, e.g. in a driving vehicle.

Then, steps 1) to 3) will be described in more details according to specific embodiments of the present disclosure. For example, steps 1) to 3) may be performed according to corresponding steps described in EP3943970A1.

Step 1) of angle finding may rely on a neural network layer trained independently from the other neural networks layers of the present disclosure, for example using ground truth. In order to generate ground truth data for training the resultant network, Doppler information from stationary objects in the environment may be used as a walk around to the resolution limit problem associated with FFT based methods.

For example, different network architectures may be used to produce outputs in different domains. Two slightly different networks may be used to be either trained to output a probability of occupancy in each respective angular sector or an energy/power spectrum.

However, by making use of a transfer learning approach in training the network, the trained weights for the network are used to very effectively estimate angles for all types of targets including non-stationary targets. This is significant because angles of non-stationary targets may not be estimated using Doppler values and therefore training for these targets would have to use a limited resolution directly from the data snapshot.

The resulting computer program may then be used on board of a vehicle to determine ego motion, for example to support or allow autonomous or semi-autonomous driving, as an additional information to determine malfunction of other vehicle sensors and/or as a backup information when another information is not available, for example in the absence of GPS signals.

In an exemplary embodiment of the present disclosure, the environment map may be derived from radar data, for example from the radars of the vehicle. The radar(s) may be an active sensor which measures the distance from time differences between outgoing and incoming waves. For example, the radar may be a frequency modulated continuous wave radar and the radar may generate a continuous wave with alternating frequencies or chirp 101, e.g., a frequency ramp overtime as visible in FIG. 2, frequency being denoted w.

An environment map of the vehicle may be derived from each frame, and for each radar of the vehicle or for all the radar of the vehicle, for example after merging all the radar data corresponding to one time frame. For example, down mixing the transmitted and received signal allows to obtain the intermediate frequency signal (IF). The frequencies of the fast time (duration of one chirp 201) IF signal are proportional to the target range, in other words, the distance to an obstacle or an object of the vehicle environment. The phase variation along multiple chirps 101 measured over a long time or slow time is proportional to the relative radial Doppler shift induced by the objects or reflectors radial movement, e.g. the relative movement of the objects of the vehicle environments. The received signal may thus be transformed into a Doppler-range diagram 102, with one diagram per antenna.

Figure 3:
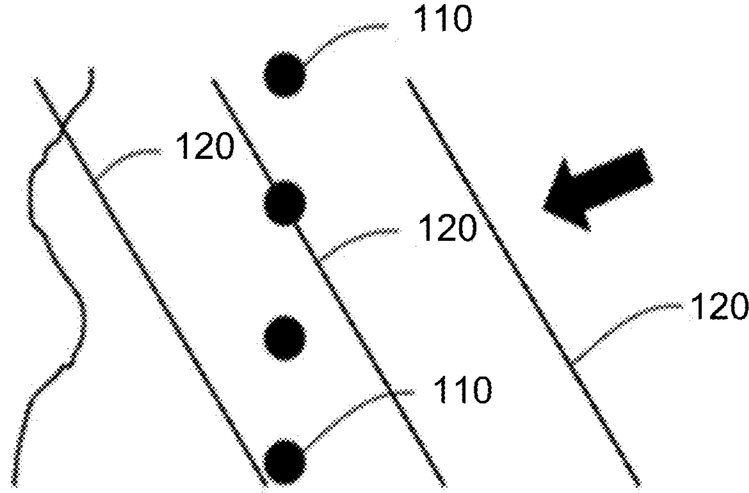
FIG. 3 is an illustration of possible radio waves received by radar antennae.

FIG. 3 shows an example of a range of antennae 110 of a vehicle. Waves 120 reflected by an object of the environment hit the multiple antennae 110 with different phases. The phase shift induces a frequency over the antenna array which is proportional to the cosinus of the direction of arrival (DOA) of the reflected waves 120, e.g. the direction of the object. Consequently, a range doppler antenna data cube may be obtained.

Figure 2:
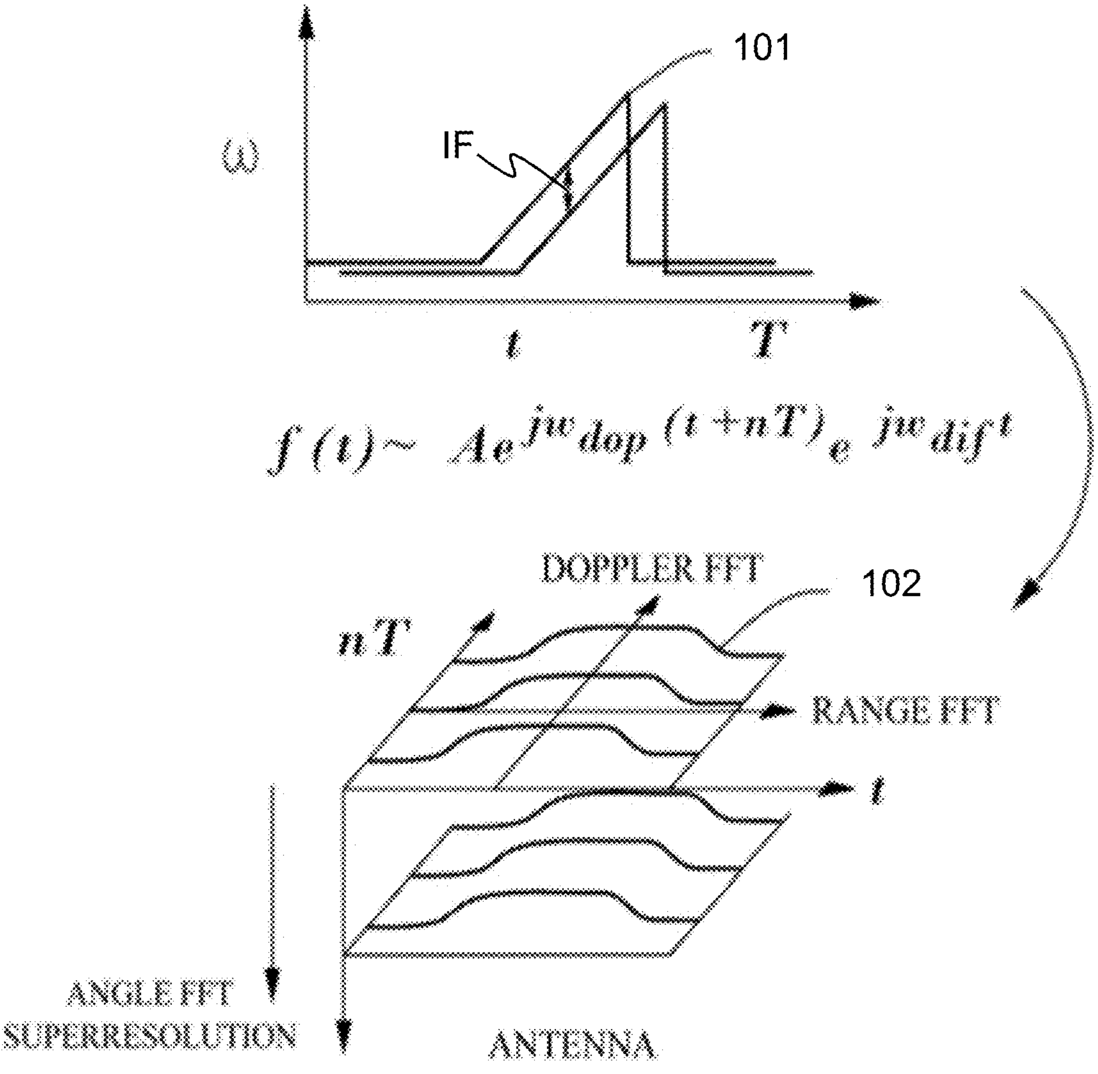
FIG. 2 is an illustration of possible radar data after a Fourier transform.

Back to FIG. 2, a bidimensional fast Fourier transform (FFT) may decompose the input signal for each antenna into frequency components and thus range and Doppler. Objects of the environment of the vehicle may appear as peaks in an integrated Doppler map, and peaks above a certain energy level may be processed with FFT/DOA estimation methods and may thus be used to detect the direction of "arrival" of the objects with a specific range Doppler value. The energy (res) may be extracted, rescaling to scale to output unit systems and looktype compensation may be extracted if needed.

Looktypes may be provided to handle the sampling problem: the sampling of a signal needs to obey the Nyquist sampling theorem, and violation of the Nyquist sampling theorem will result in ambiguities in the reconstructed signal. The problem may be resolved for the range by low pass filtering to remove frequencies higher than fsampling/2.

Regarding Doppler, using different resolutions for different scans or frames (Looktypes) may yield to different ambiguous results, and temporal fusion methods (e.g. tracking) may then be used to resolve the ambiguities by using at least two detections of the same object. In this context, range looktypes refer to different resolutions in range so that it is also possible to get finer resolution (every n-th frame). For example, the data cube may include different resolutions, for example four different resolutions (in other words: four looktypes).

In step 1), a step of angle finding may be performed. As an input, a 3D Compressed Data Cube (CDC) may be used. This data cube may be sparse as all beam vectors below CFAR (constant false alarm rate) level may be suppressed. Missing antenna elements in the beam vector may be interpolated. Calibration may be applied and the bin values may be scaled according to the radar equation. Alternatively, uncompressed data cubes may be used, and a machine learning based bin suppression method may be utilized.

Angle finding may be achieved through machine learning, for example with the use of an angle finding neural network. This angle finding neural network may be a multi-layer perceptron (MLP) which may share the same parameters across all beam vectors or may be more complex provided efficient angle finding can be performed. The angle finding neural network may create range, angle, Doppler data cubes which may be subsequently processed with convolution layers to filter the input.

Figure 4:
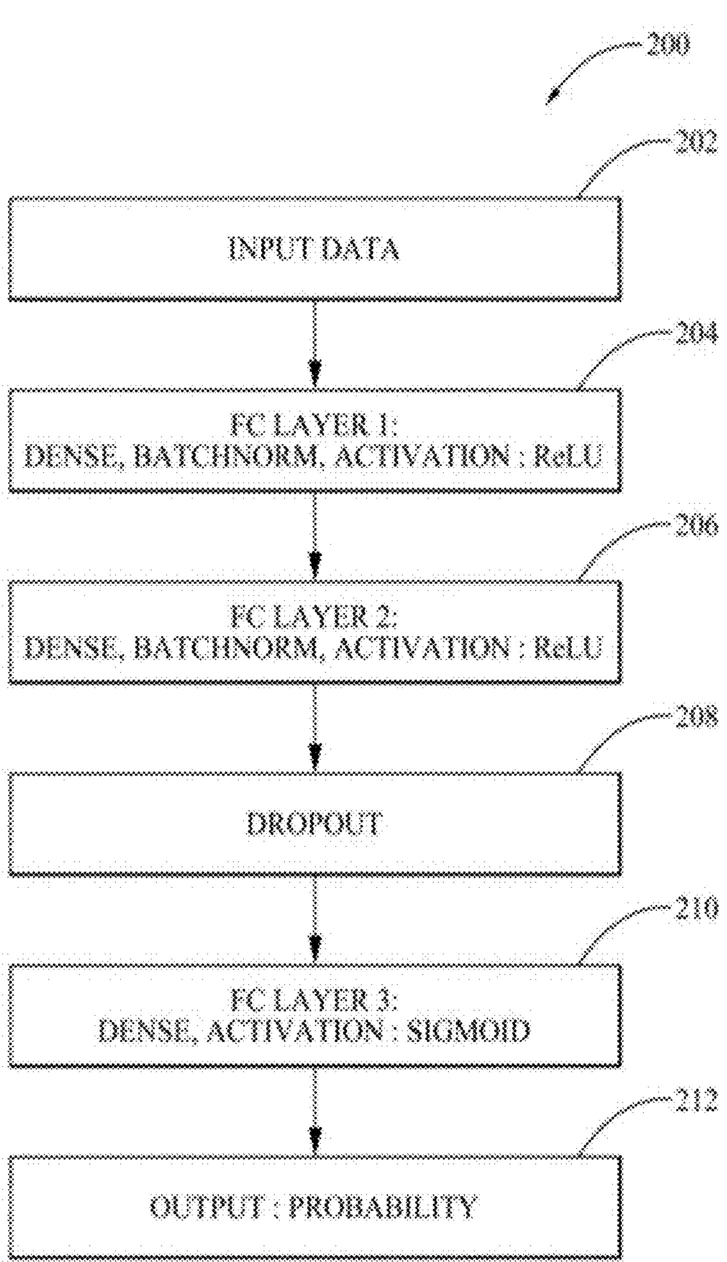
FIG. 4 is a flow chart of a method of angle finding according to an example.

FIG. 4 shows an illustration 200 of a first example of a multi-domain direction of arrival estimation (angle finding) neural network according to an example. A multilayer perceptron (MLP) consisting of several dense layers 204, 206, 210 may be used in combination with batch normalization and a rectified linear unit (ReLU) as an activation function for each layer except the last layer 210. The input 202 may either be a beam vector or an autocorrelation matrix calculated with that beam vector. Before the last dense layer 210 is applied, a dropout layer 208 may be used to make the training more robust. The last layer 210 may use a sigmoid activation to create probabilities for each output neuron. Each output neuron 212 may represent an angular bin and the value indicates the probability that this angular region is occupied.

This architecture has the advantage that it can be used for a changing number of objects or targets in different input beam vectors.

Figure 5:
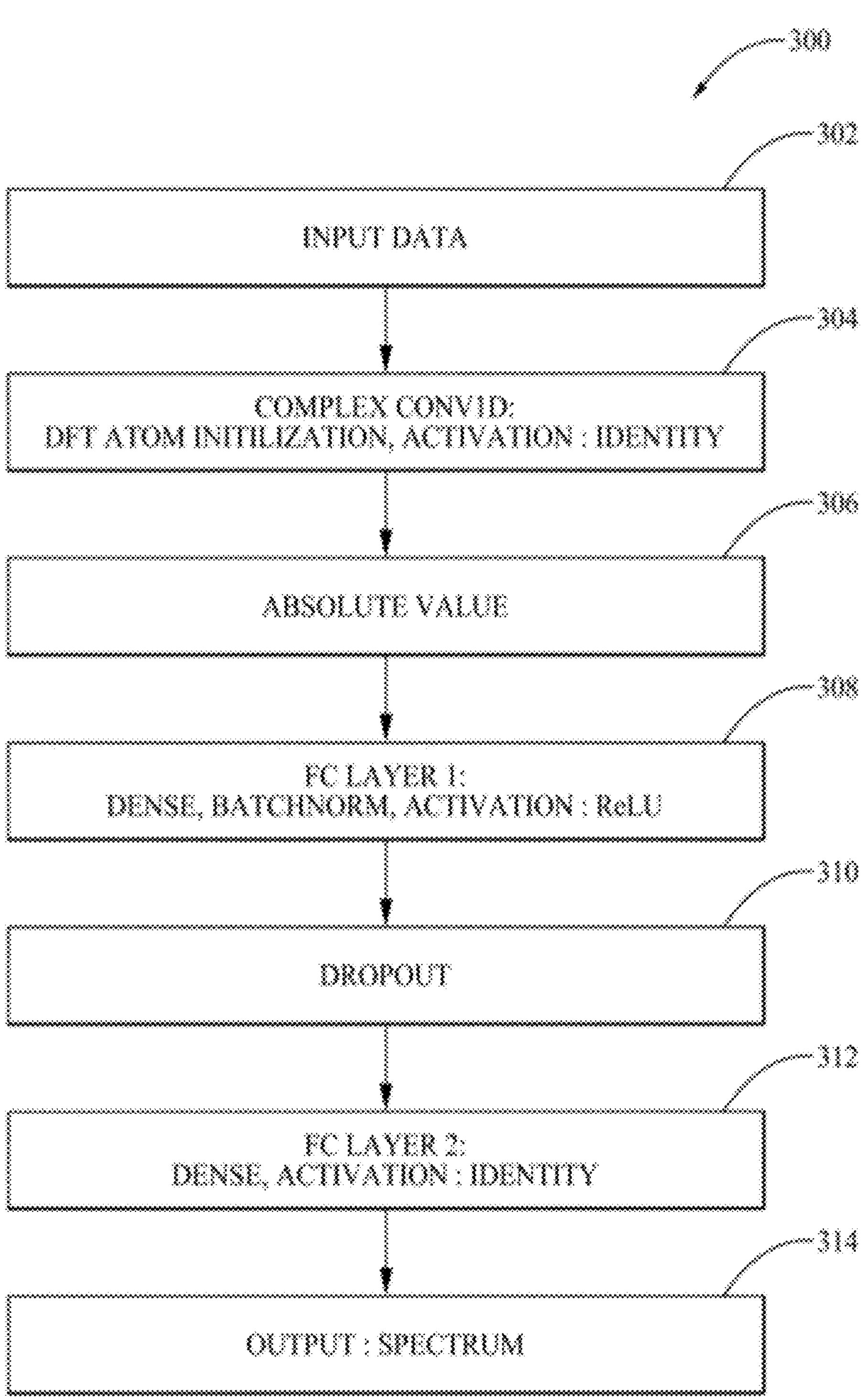
FIG. 5 is a flow chart of a method of angle finding according to another example.

FIG. 5 shows an illustration 300 of a second example of a multi-domain direction of arrival estimation (angle finding) neural network according to an example. In this example, it may be desired not only to know the angles of the targets detected by the radar, but also to retrieve the information about the amount of energy each target reflects. That means that the output of the network represents no longer a probability for each angular bin being occupied. Instead, each neuron represents the amount of energy arriving from the corresponding angular region.

Therefore, in the network of the second example, the sigmoid activation is removed (e.g. is not present) in the last layer 312 which provides the output 314. As the Euclidean norm of such a spectrum is the same as the Euclidean norm of the input beam vector, it may be desired to enforce the network to preserve the energy of the input. For that purpose, an additional activation regularization term may be introduced to a loss function which consists of the absolute difference between the norm of the input and the output.

This activation regularization term may be weighted with an adjustable hyperparameter and may either be applied on the input and output of the whole network or on the input and output of each layer. In the latter case, the errors of the different layers are summed up.

Another change in the network design is the usage of a one-dimensional convolutional layer (Conv1D) as the very first layer 304, which receives the input data 302. This layer may represent a learnable version of a Discrete Fourier Transformation (DFT). This means that this layer may be constructed to have complex weights which may be initialized with the atoms of the DFT. Additionally, this layer may be used without activation and bias. After that convolutional layer 304, the absolute value 306 of that complex output tensor may be calculated as this value represents the magnitude in a classical DFT. The rest of the network is operating on real numbers like in the first embodiment, so that after the absolute value 306 is determined, a fully connected layer 308 (FC layer) and a dropout layer 310 are provided.

Figure 6A:
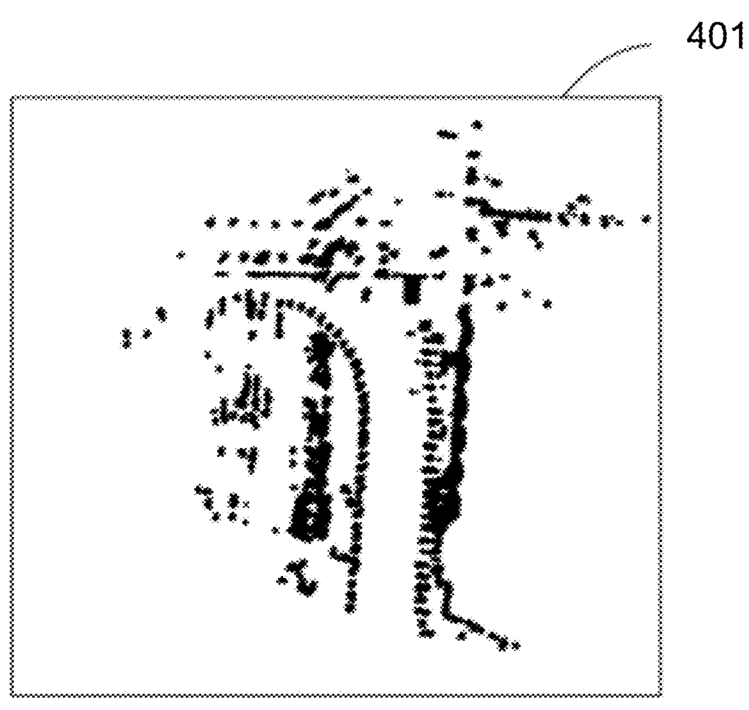
FIGS. 6A and 6B show an illustration of an environment map or occupancy grid mapping after classical pre-processing angle finding (FIG. 6A) and after angle finding according to the examples (FIG. 6B).
Figure 6B:
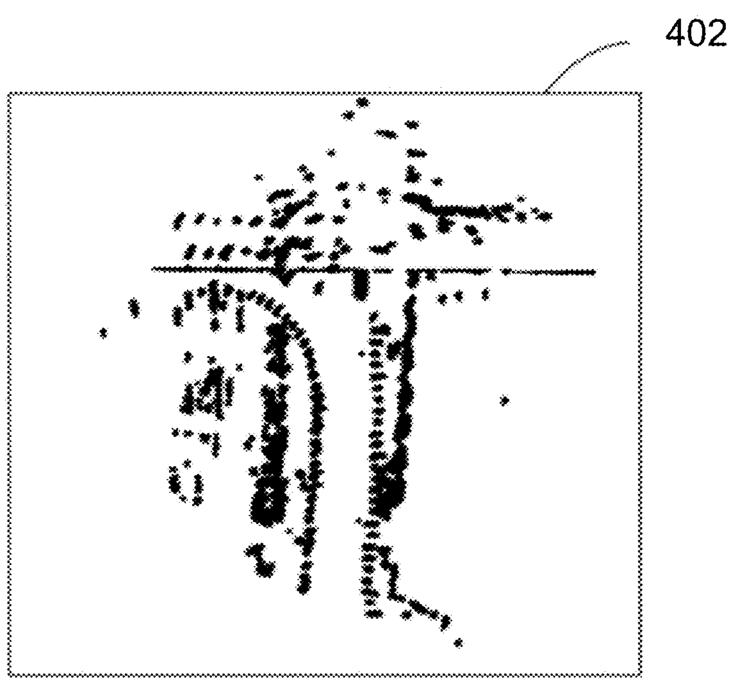

FIGS. 6A and 6B shows an illustration 500 of an environment map or occupancy grid mapping after classical pre-processing angle finding (FIG. 6A; 401) and after angle finding by machine learning according to the above examples (FIG. 6B; 402). The environment map obtained by the disclosure is globally similar to the environment map obtained by classical angle finding but include more features and is thus more accurate.

In the case of a prior compression of the Doppler channels, the range angle doppler data cubes may have only one or few doppler channels (for example 2 to 5 doppler channels. Consequently, an environment polar map including features defined by polar coordinates may be obtained. The features may be either abstract features, for example coming from noise or variance in the radar data or real features, e.g. features corresponding to objects of the surrounding environment of the vehicle.

The number of Doppler channels is not particularly limited and may be adapted to the particular application of the present method. For example, only one Doppler channel may be preferable in the case of using the ego motion of the present disclosure as a redundancy system.

Compression may be performed in step 2) in order to reduce the size of the frames, for example before or after the step of angle finding. For example, the frame resolution may be lowered and/or the number of Doppler channels may be reduced to one or several feature channels, for example five feature channels. Indeed, a frame may have 200 to 500 doppler channels. Preferably, the number of doppler channels is reduced to one or a small number of features channels. Most preferably, only one feature channel is kept after compression of the Doppler channels.

Since Doppler depends on the relative speed of the objects, information about speed may be eliminated from the radar data and/or of the environment map. The output of this compression step may be under the form of range, antennae, feature data cubes or files, in which the feature channel may include one or more than one channel.

Such a compression step may be performed by simply summing or stacking the Doppler channels, using a dense neural network layer in Doppler dimension, and/or performing a one-dimensional convolution in the doppler dimension followed by a sum in the Doppler dimension and/or a concatening method. Various other compression method may be used, including data compression methods involving data loss. Because of the compression, the link between signal strength and objects and the compressed radar data may be blurred and the compressed radar data may contain abstract features resulting from the compression and/or from noise or variance. These abstract features may be eliminated in the following steps of the present method.

Then, an environment map may be derived from the angle, range, doppler data cubes or the angle, range, feature data cubes, preferably in Cartesian coordinates such as vehicle coordinate system (VCS), according to step 3). This may be performed by neural network layers, such as a VCS neural network layers. The VCS neural network layers may include one or several convolutional layers, pooling layers and/or self-attention layers. If the vehicle includes different radars, max pooling may be applied to fuse the results of different radars, in order to generate feature planes combining the observation feature planes from all radars.

Figure 7:
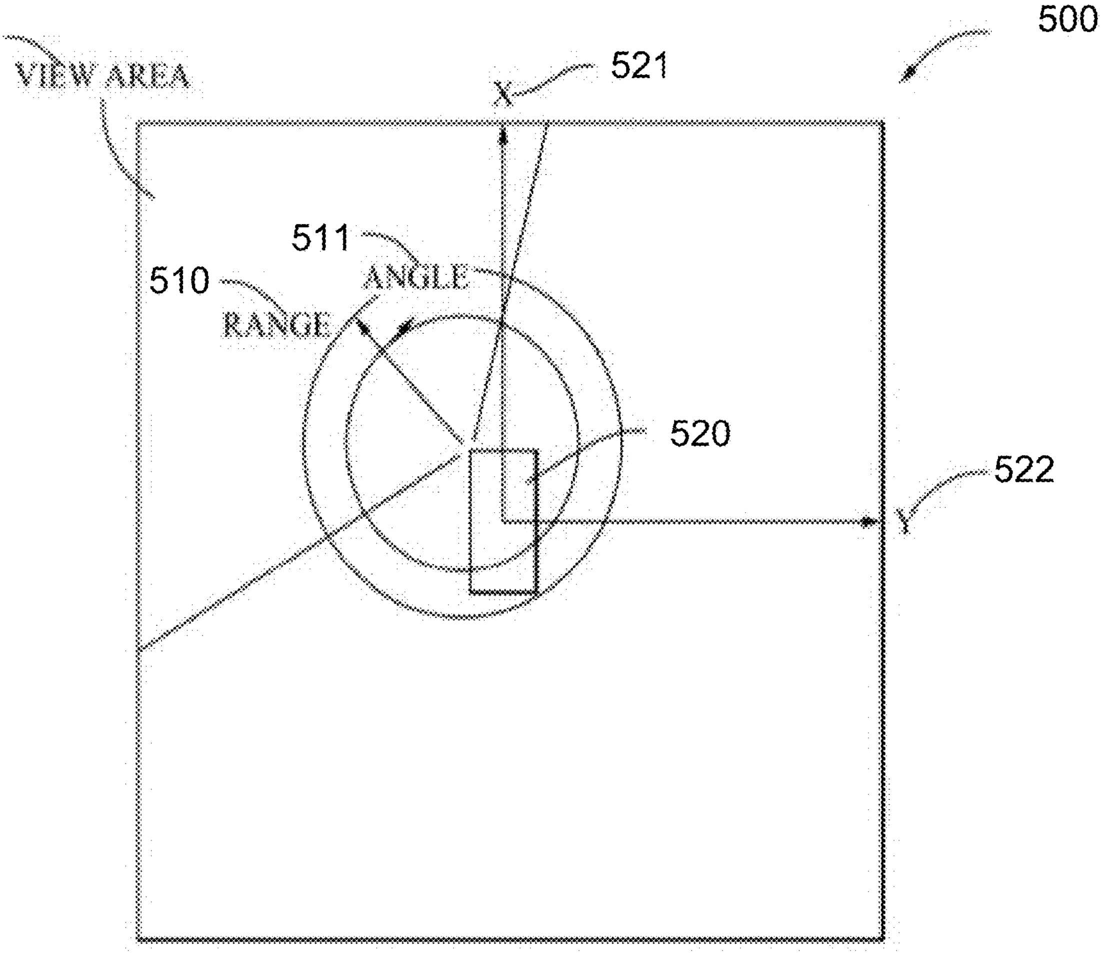
FIG. 7 is an illustration of a coordinate conversion according to an example.

FIG. 7 shows an illustration 500 of a coordinate conversion according to various embodiments, for example a conversion into VCS coordinates. A view area 501 of the vehicle surrounding environment is shown, in which a sensor coordinate system (in range 510 and angle 511) is illustrated. A vehicle 520 may define coordinates in the VCS (in x direction 521 and y direction 522).

The conversion from sensor coordinate system to the vehicle coordinate system (VCS) may be provided within the network structure. The VCS may be a Cartesian 2d/3d coordinate system (x, y, z axes), fixed at a reference point at the vehicle. The sensor coordinate system may be a polar system (range, angle) at the position of the sensor. The output of step 3), e.g., the environment map is thus under the form of x, y, feature data cubes or files, x and y being the Cartesian coordinates.

For the conversion from the sensor coordinate system to the vehicle coordinate system, each (Doppler) feature channel may be resampled to a Cartesian VCS grid using bilinear interpolation. High resolution may be used in intermediate steps to avoid subsampling issues followed by max pooling resolution reduction. The results of the conversion may be a Cartesian data cube.

Figure 8:
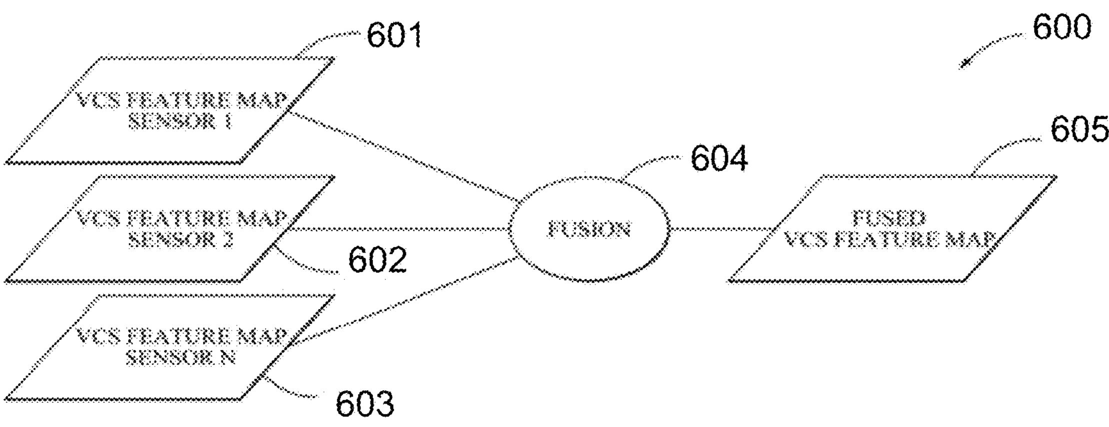
FIG. 8 is an illustration of radar fusion according to an example.

FIG. 8 shows an illustration 600 of radar fusion according to an example. VCS environment map or feature maps 601, 602, 603 (each one from a different radar) may be fused (604) to a fused VCS environment map or feature map 605. fi(j,x,y) may denote the j feature map from sensor i. The feature maps may stem from different processed Doppler channels or different sensors. A fused channel ffused(j,x,y) may be generated using ffused(j,x,y)=fk(j,x,y) for each j,x,y cell, where k=argmaxi|fi(j,x,y)|. Alternatively, other fusion approaches like e.g. ffused(j,x,y)=maxi|fi(j,x,y)| may be used. Multi-layer perceptron (MLP) networks, attention and gating mechanisms or other complex sensor fusion network mechanisms may be used for radar fusion.

The environment map obtained above for each frame may be accumulated in step 4). For example, at least two environment maps may be accumulated, for example five or ten environment maps, preferably consecutive in a predetermined period of time. For example, an accumulated map may cover a short period of time, for example 10 ms to 3 s or 100 ms to 1 s. This accumulation step may be performed by overlaying the environment maps. Consequently, if the accumulated environment map was represented as a picture, a same feature of the environment map may appear several times, at a shifted position, thus showing traces or patterns.

Possible accumulation techniques may include summing the frames, concatenating the frames in the feature dimension, staking the frames in the time dimension and merging the frame using one or several dense neural network layers or using one or several recurrent neural network layers, for example of the type of long-short term memory (LSTM) or gated recurrent unit (GRU).

Figure 9:
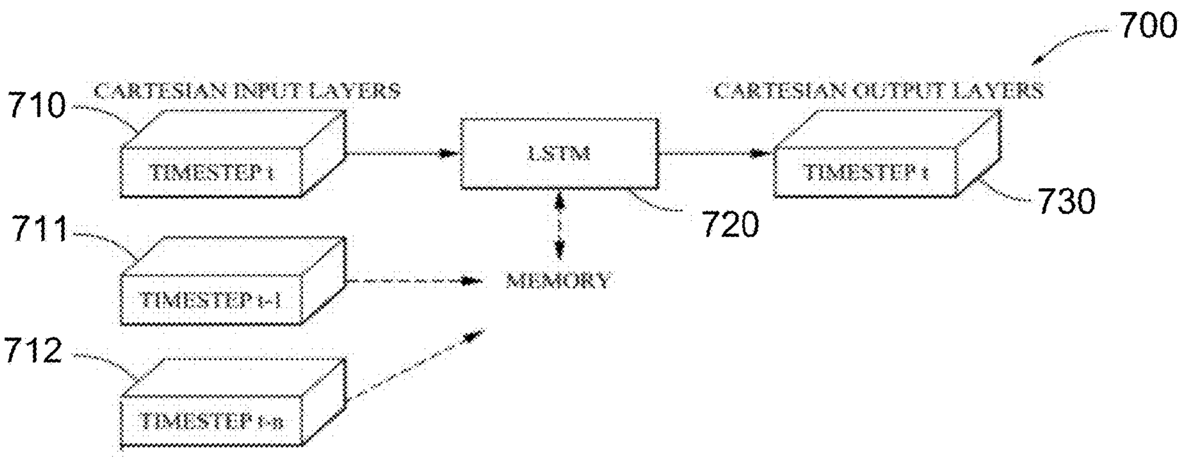
FIG. 9 is an illustration of accumulation or temporal fusion according to an example.

FIG. 9 shows an illustration 700 of accumulation or temporal fusion according to an example. Environment map 710 from time step t may be provided to LSTM neural network layers 720, which may also involve an environment map 711 from time step t−1 and from further previous time steps (such as environment map 712 from time step t−n), which may provide a memory to the system. The LSTM neural network layers 720 may output data 730 at time step t. The environment map may be provided as Cartesian data cubes, and the output may be provided as Cartesian data cubes, e.g. Cartesian environment map.

With the accumulation of environment maps, while one radar scan or frame may be noisy and sparse, recurrent neuronal network layers may be applied to fuse/aggregate information 710, 711, 712 from multiple time steps to generate one accumulated map 730 which thus include history of the vehicle environment and also increase the reliability of the environment map. The convolutional LSTM neural network layers 720 may be used as recurrent neuronal network structure to allow to encode spatial relationships and displacements between time steps and to avoid the gradient vanishing problem.

Figure 10:
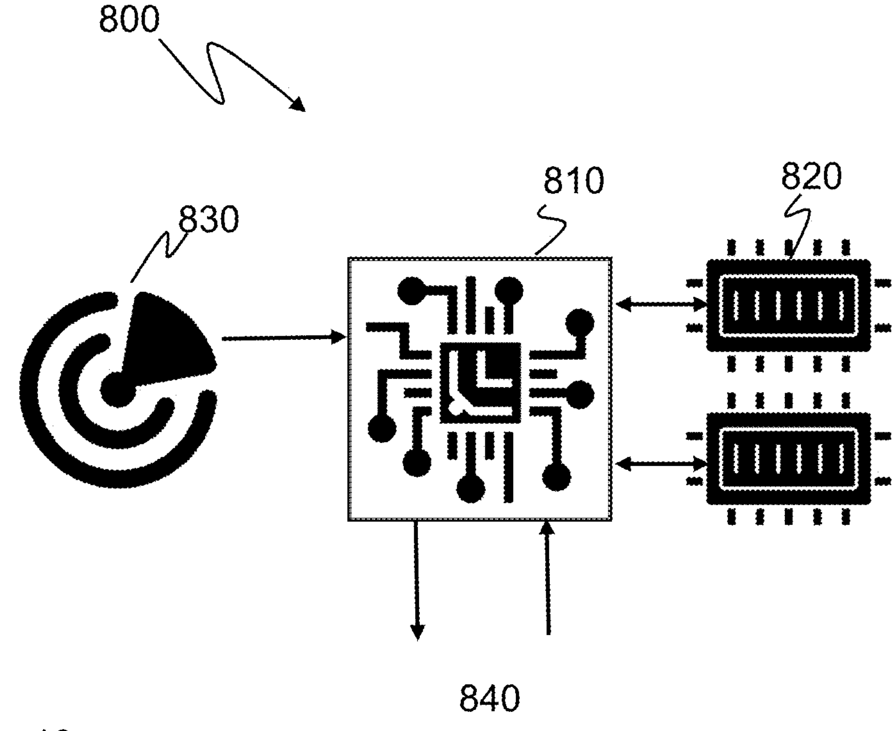
FIG. 10 is a schematic hardware system according to an example to perform the present method.

FIG. 10 provides an example of a hardware system 800 adapted to implement the present method. The hardware system 800 may include a processing unit 810, including one or several processors adapted to perform all of some of the different steps of the present method. The processing unit 810 may be connected to one or several memory units 820, for example for storing radar data, environment maps, accumulate environment maps, mask maps and the computer program implementing the present method.

The processing unit 810 may be connected to one or several radar units 830 comprising a radar emitter and one or several antennae 110 (see FIG. 3).

The processing unit 810 may have various input/output 840 in order to communicate with other units such a semi-autonomous or full-autonomous driving unit and/or to remote computers such as a control center for the vehicle. The processing unit 810 may perform all the steps of the present method. For example, the processing unit may be embedded in the vehicle.

In other example, the processing unit performing the present method is located in a remote environment and the processing unit 810 only collects, stores and transmit radar data. Alternatively, the hardware system 810 may be part of or integrated to the semi-autonomous or full-autonomous driving unit.

The above steps may be selected and combined in any order and may be performed sequentially or in parallel, depending on the specific implementation of the present methods, providing ego motion and/or reference points are provided according to the present disclosure.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

What is claimed is:

1. A computer implemented method to determine ego motion of a vehicle having at least one radar emitter with a plurality of reception antennae, the method comprising:

acquiring, from the reception antennae, different frames of radar data of a vehicle surrounding environment, each frame being acquired at a different time;

deriving from the radar data of each different frame, an environment map of the vehicle surrounding environment; and deriving the ego motion of the vehicle by:

merging environment maps from at least two different frames into one accumulated map by providing a sequence of environment maps to one or more recurrent neural network layers, wherein the accumulated map is a digital image or file comprising a plurality of pixels and the one or more recurrent neural network layers comprise convolutional long-short term memory (LSTM) layers configured to encode spatial relationships and displacements between different time steps to generate the accumulated map;

computing, from the accumulated map, a motion vector for each pixel of the accumulated map, wherein each pixel of the accumulated map is assigned two X values and two Y values defining the motion vector; and extracting, from the accumulated map, a mask map including a tensor mapping a weight for each pixel of the accumulated map, wherein the mask map is extracted by one or more neural network layers comprising one or more of a convolutional layer, a pooling layer, and a self-attention layer.

2. The computer implemented method of claim 1, wherein deriving the ego motion includes:

associating each motion vector with a weight of the mask map.

3. The computer implemented method of claim 1, wherein deriving the ego motion includes:

computing a translation and a rotation of the vehicle surrounding environment introduced by a movement of the vehicle, based on the computed motion vectors and the extracted mask map.

4. The computer implemented method of claim 1, wherein deriving the ego motion includes:

deriving a x-speed, a y-speed, and a yaw speed of the vehicle.

5. The computer implemented method of claim 1, further including:

extracting reference points from the mask map, the reference points being associated with objects of the surrounding environment of the vehicle.

6. The computer implemented method of claim 1, further including:

graphically representing at least one of the mask map or the environment map to a display of the vehicle.

7. The computer implemented method of claim 1, further including:

graphically representing one or more characteristics extracted from at least one of the mask map or the environment map.

8. The computer implemented method of claim 1, wherein computing a motion vector for each pixel of the accumulated map and extracting the mask map is performed by one or more layers of a trained neural network.

9. The computer implemented method of claim 1, wherein the radar data includes a plurality of Doppler channels and deriving an environment map of the vehicle surrounding environment includes:

reducing the plurality of Doppler channels to one feature channel.

10. The computer implemented method of claim 1, further including:

controlling one or more functions of an advanced driver-assistance system (ADAS) of a vehicle.

11. A method for training a neural network for determining ego motion of a vehicle, the method comprising:

providing different frames of radar data of a training vehicle surrounding environment and at least one of corresponding localization or driving information of the training vehicle;

deriving ego motion from the radar data by:

acquiring different frames of radar data of the training vehicle surrounding environment, each frame being acquired at a different time;

deriving from the radar data of each different frame, an environment map of the vehicle surrounding environment; and deriving the ego motion of the vehicle by:

merging environment maps from at least two different frames into one accumulated map by providing a sequence of environment maps to one or more recurrent neural network layers, wherein the accumulated map is a digital image or file comprising a plurality of pixels and the one or more recurrent neural network layers comprise convolutional long-short term memory (LSTM) layers configured to encode spatial relationships and displacements between different time steps to generate the accumulated map;

computing, from the accumulated map, a motion vector for each pixel of the accumulated map, wherein each pixel of the accumulated map is assigned two X values and two Y values defining the motion vector; and extracting, from the accumulated map, a mask map including a tensor mapping a weight for each pixel of the accumulated map, wherein the mask map is extracted by one or more neural network layers comprising one or more of a convolutional layer, a pooling layer, and a self-attention layer;

deriving ground truth ego motion based on the at least one of localization or driving information; and determining optimal weights of a neural network by minimizing a loss function between the ego motion as an input and the ground truth ego motion as a target output.

12. The method of claim 11, wherein deriving the ego motion includes:

associating each motion vector with a weight of the mask map.

13. The method of claim 11, wherein deriving the ego motion includes:

computing a translation and a rotation of the vehicle surrounding environment introduced by a movement of the vehicle, based on the computed motion vectors and the extracted mask map.

14. The method of claim 11, wherein deriving the ego motion includes:

deriving a x-speed, a y-speed, and a yaw speed of the vehicle.

15. The method of claim 11, further including:

extracting reference points from the mask map, the reference points being associated with objects of the surrounding environment of the vehicle.

16. The method of claim 11, further including at least one of:

graphically representing at least one of the mask map or the environment map to a display of the vehicle; or graphically representing one or more characteristics extracted from at least one of the mask map or the environment map.

17. The method of claim 11, wherein computing a motion vector for each pixel of the accumulated map and extracting the mask map is performed by one or more layers of the trained neural network.

18. The method of claim 11, wherein the radar data includes a plurality of Doppler channels and deriving an environment map of the vehicle surrounding environment includes:

reducing the plurality of Doppler channels to one feature channel.

19. The method of claim 11, further including:

controlling one or more functions of an advanced driver-assistance system (ADAS) of a vehicle.

20. A non-transitory computer-readable medium comprising instructions which, when executed by a computer, cause the computer to:

acquire, from a vehicle radar emitter with a plurality of reception antennae, different frames of radar data of a vehicle surrounding environment, each frame being acquired at a different time, wherein the radar data includes a plurality of Doppler channels;

derive, from the radar data of each different frame, an environment map of the vehicle surrounding environment by reducing the plurality of Doppler channels to one feature channel and resolving Doppler ambiguities by acquiring the different frames of radar data using different looktypes, wherein the different looktypes comprise different resolutions in range or resolutions in Doppler for different frames, and wherein the Doppler ambiguities are resolved by performing a temporal fusion of at least two detections of a same object across the different frames; and derive ego motion of the vehicle by:

merging environment maps from at least two different frames into one accumulated map, wherein the accumulated map is a digital image or file comprising a plurality of pixels;

computing, from the accumulated map, a motion vector for each pixel of the accumulated map, wherein each pixel of the accumulated map is assigned two X values and two Y values defining the motion vector; and extracting, from the accumulated map, a mask map including a tensor mapping a weight for each pixel of the accumulated map, wherein the mask map is extracted by one or more neural network layers comprising one or more of a convolutional layer, a pooling layer, and a self-attention layer.

* * * * *